UNITED STATES PATENT OFFICE 2,447,702

METHOD FOR PRODUCING BENZOLSULFON-AMIDO-1,3,4-THIODIAZOLE COMPOUNDS

Oluf Hübner, Klampenborg, near Copenhagen, Denmark, assignor to H. Lundbeck & Co., Kemisk Pharmaceutisk Laboratorium A/S, Copenhagen, Denmark, a firm No Drawing. Application November 23, 1942, Serial No. 466,598½. In Denmark April 1, 1942

11 Claims. (Cl. 260—239.6)

It is already known to use p-substituted benzolsulphonamido-1,3,4-thiodiazol compounds, which in the p-position have an amino group or a group, which may be transformed into an amino group. These compounds are very effective against infections, particularly cocci-infections, and especially p-aminobenzolsulphonamides of the 1,3,4-thiodiazole series and its 5-alkyl-derivate have proved to be of a great therapeutic value.

The production of these compounds hitherto has been carried out either by condensation of halogenated thiodiazols with benzolsulphonamid which is substituted in the p-position or by condensation of aminosubstituted thiodiazols with for instance p-substituted benzolsulphonhalogenid.

It has now been found that the said compounds may be produced in quite another way.

According to the invention compounds of the type

in which X indicates a group, which may be transformed into an amino group, and Y, a group which may be condensed with an amino group, are brought, instead of with aminosubstituted thiodiazol, to react with a thiosemicarbazone of an aliphatic aldehyd, after which the condensation product is treated with an oxidizing agent, at which the thiosemicarbazone group during ring formation is transformed into a thiodiazol group.

X for instance may be an acylamino-, a nitro-, an azo- or a hydrazid-group, and Y for instance may be Cl, Br, I, or Fl.

The reaction takes place in accordance with the following scheme, in which X and Y have the significance above mentioned and Z indicates hydrogen or alkyl.

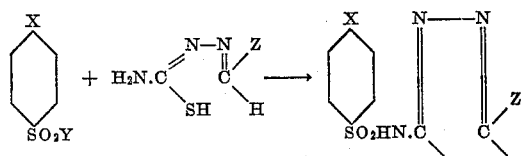

The first part of the method advantageously is carried out in a basic medium, for instance pyridin.

The oxidation of the condensation product of the p-substituted benzolsulphone compound and the thiosemicarbazone may be carried out by means of already known oxidizing agents, for instance calciumferricyanid.

After the ring formation the group X if desired may be transformed into an amino group.

If X is an acyl group, the transformation into an amino group in some cases may be carried out simultaneously with the oxidation, viz. if this takes place in a medium with a degree of acidity, which advances hydrolysis.

The invention will now be illustrated by means of an example, and it is understood, that the same of course is not limited to the statements in the example.

Example

To 10 g. acetaldehyd-thiosemicarbazone in 80 g. pyridin gradually 20 g. p-acetaminobenzolsulphonylchlorid is added. The reaction mixture is heated about 1 hour on a water bath and is then charged in 1 l. water, to which some acetic acid is added. The bottom sediment is sucked off and washed with water, after which it is crystallized by alcohol. 20 g. of the condensation product thus obtained is cleared in 100 ccm. water at about 80°, after which 45 g. calcium ferricyanid dissolved in about 100 ccm. water is added. The reaction mixture is made slightly alkaline and held at a temperature of about 80° for 2-3 hours. It is important that the reaction mixture during the whole period of 2-3 hours is steadily held alkaline. After the said 2-3 hours the liquid is cooled and the bottom sediment, which has a greenish color, is filtered off. The liquid sucked off eventually is treated with active carbon, filtered and made slightly acid by means of acetic acid, at which 2-amino-benzolsulphonamido-5-methyl-1,3,4-thiodiazol (melting point 204-206° C.) is precipitated.

I claim:

1. A method for production of p-substituted benzolsulphonamido-1.3.4-thiodiazol compounds, in which a compound of the type

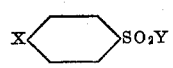

in which X is selected from the group consisting of acylamino, nitro, azo, and hydrazid radicals, and Y is halogen, is reacted with a thiosemicar-

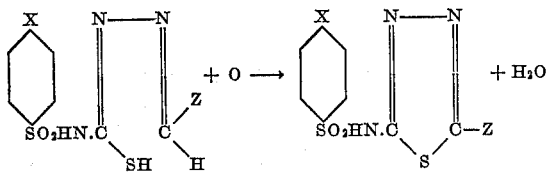

bazone of an aliphatic aldehyde having the formula $$H_2N.C(SH)=N-N=CH.Z$$

where Z is selected from the group consisting of hydrogen and alkyl radicals, and the condensation product is treated with an oxidizing agent whereby the thiosemicarbazone group is transformed into a thiodiazol group by ring formation.

2. A method as set forth in claim 1, in which the condensation is carried out in an alkaline medium.

3. A method as set forth in claim 1, in which the condensation is carried out in an alkaline medium containing pyridin.

4. A method as set forth in claim 1, in which the oxidation is carried out in an alkaline medium.

5. A method as set forth in claim 1, in which both the condensation and oxidation steps are carried out in an alkaline medium.

6. A method as set forth in claim 1, in which X is an acylamino group.

7. A method as set forth in claim 1, in which X is an acylamino group and Y is a halogen.

8. A method as set forth in claim 1, in which X is an acylamino group, Y is a halogen, and the condensation is carried out in an alkaline medium.

9. A method of making 2-amino-benzolsulphonamido-5-methyl-1.3.4-thiodiazol which comprises reacting acetaldehyde-thiosemicarbazone with p-acetaminobenzolsulphonylchloride in an alkaline medium containing pyridin to produce a condensation product, and oxidizing said condensation product with an oxidizing agent in an alkaline medium whereby the thiosemicarbazone group is transformed into a thiodiazol group by ring formation, and recovering 2-amino-benzolsulphonamido-5-methyl-1.3.4-thiodiazol from the reaction mixture.

10. In a method of producing p-substituted benzolsulphonamido-1.3.4-thiodiazol compounds, the step in which a compound of the type

in which X is selected from the group consisting of acylamino, nitro, azo, and hydrazid radicals, and Y is halogen, is reacted with a thiosemicarbazone of an aliphatic aldehyde having the formula $$H_2N.C(SH)=N-N=CH.Z$$

where Z is selected from the group consisting of hydrogen and alkyl radicals, the reaction being carried out in an alkaline medium.

11. A method as set forth in claim 10, in which X is an acylamino group, and Y is a halogen.

OLUF HÜBNER.

REFERENCES CITED

The following references are of record in the file of this patent:

UNITED STATES PATENTS

| Number | Name | Date |
| --- | --- | --- |
| 2,358,031 | Roblin | Sept. 12, 1944 |

OTHER REFERENCES

Jour. Amer. Chem. Soc., Aug. 1940, pages 2002–2005.

Proc. Indian Acad. of Sciences, vol. 13–A, May 1941 (pp. 386–389).